United States Patent [19]

Medrano

[11] 3,927,388
[45] Dec. 16, 1975

[54] DIVERS NAVIGATION DISPLAY
[75] Inventor: Alfred M. Medrano, San Diego, Calif.
[73] Assignee: The United States of America as represented by the Secretary of the Navy, Washington, D.C.
[22] Filed: Sept. 30, 1974
[21] Appl. No.: 510,347

[52] U.S. Cl. ............................ 340/6 R; 343/113 R
[51] Int. Cl.[2] .......................................... G01S 3/80
[58] Field of Search ....... 340/6 R, 16 R; 343/113 R; 235/150.26

[56] References Cited
UNITED STATES PATENTS
3,711,820  1/1973  Starkey ............................. 340/6 R
3,792,246  2/1974  Gilbreath et al. ............... 235/150.26

Primary Examiner—Richard A. Farley
Attorney, Agent, or Firm—Richard S. Sciascia; Ervin F. Johnston; William T. Skeer

[57] ABSTRACT

A digital circuit for computing unknown angle $\theta$ comprises first and second programmable read-only-memories (PROMS) each outputting an eight-bit representation of the logarithm of respective digital inputs representing $K\sin\theta$ and $K\cos\theta$ respectively. Second PROMS each output the two's compliment of the logarithm respective digital inputs, a pair of adders connected to the PROMS produce an output corresponding to the logarithm of tangent $\theta$, another pair of PROMS are connected to the adders and are programmed as look-up tables to produce outputs corresponding to $\theta$. A latch circuit and a digital-to-analog convertor complete the novel circuit.

4 Claims, 3 Drawing Figures

3,927,388

DIVERS NAVIGATION DISPLAY

STATEMENT OF GOVERNMENT INTEREST

The invention described herein may be manufactured and used by or for the Government of the United States of America for governmental purposes without the payment of any royalties thereon or therefor.

FIELD OF THE INVENTION

This invention pertains to the field of data processing. In still greater particularity, this invention pertains to digital processing circuitry. By way of further characterization, this invention pertains to digital circuitry to solve a particular algorithm. By way of further characterization, but without limitation thereto, the invention pertains to a navigation instrument. By way of further characterization, the invention will be described as it pertains to a diver-carried underwater beacon-homing navigation instrument.

DESCRIPTION OF THE PRIOR ART

Prior art methods of determining bearing angle $\theta$ from sine $\theta$ and cosine $\theta$ information used electromagnetic resolvers. This input information allowed $\theta$ to vary from 0° to 360° by using inputs of plus or minus $K\sin\theta$ or plus and minus $K\cos\theta$ the signs being governed by compass the quadrants of bearing angle $\theta$. Depending on the particular sine of the value, each input would be applied to one of two electromagnetic coils that formed a composite field coil of an electric motor. Thus, for any angle $\theta$, two fields would be produced with their strengths dependent on the value of the voltage applied to the electromagnets. For such electromagnets together comprise the field coil of such a readout instrument each electromagnet occupying one quadrant. Each electromagnet was comprised of four poles and these poles were wound in such a manner that by applying a voltage pulse, whose pulse rate was proportional to the trigonometric values of the bearing angle, a field would be produced that would resolve angle $\theta$ by moving an armature within the field of coils. Although the armature may have been a permanent magnet, the energization of these field coils required a considerable amount of power to produce a dependable bearing angle indication.

Although such a system has satisfactory applications in many fields, it has noticeable shortcomings when applied to a diver carried instrument. For example, with a total of sixteen poles in the field coil the accuracy of the system turned out to be 22.5°. Although such an accuracy is satisfactory for some surface applications, in the limited visibility regions where diver carried instruments are used a greater accuracy was required. Further, the permanent magnet type armature, the lowest power consumption system of this general type, tended to lock on one of the sixteen poles such that a large change in bearing angle was required to cause the armature to assume a new indicating position. Also, once the new indicating position was obtained, the field coils required continuing energization to maintain the indication.

Although all electronic circuits for resolving bearing angles are known, such a circuitry has been adapted for use with several motor systems and cathode ray tube displays. Such systems are not adaptable to diver-carried, underwater navigation instruments.

SUMMARY OF THE INVENTION

This invention overcomes the above discussed difficulties with the prior art by providing an electronic circuit which uses very low power to solve bearing angle from digital signals corresponding to the sine and cosine of that angle. A first programmed read-only memory (PROM) receives digital information corresponding to $K\sin\theta$. A second PROM receives information corresponding to $K\cos\theta$ where K represents a constant. The first PROM is programmed to function as a look-up table in which the logarithm of the input information is stored. The second PROM similarly functions as a look-up table in which two's compliment of the logarithm of the input cosine information is stored. An outer circuit is connected to each of the PROMS to sum their outputs and thereby generate an output corresponding to tangent $\theta$. A third PROM is coupled to receive this tangent $\theta$ information and is programmed as a look-up table for the arc tangent of the input value. The output of this PROM, corresponding to $\theta$ is held by a suitable latch circuit which in turn is connected to a digital-to-analog convertor which generates an analog function of the bearing angle $\theta$.

STATEMENT OF THE OBJECTS OF INVENTION

It is accordingly an object of this invention to provide an improved digital signal processing circuit.

A further object of this invention is to provide a digital circuit having low power drain.

Another object of this invention is to provide a digital electronic circuit suitable for use in a diver-carried navigation instrument to solve bearing angle equations.

A still further object of this invention is to provide an improved diver's navigation system display subsystem for determining bearing angles.

These and other objects of the invention will become more readily apparent from the ensuing specification taken together with the drawings.

DESCRIPTION OF THE PREFERRED EMBODIMENT

Figure 1:
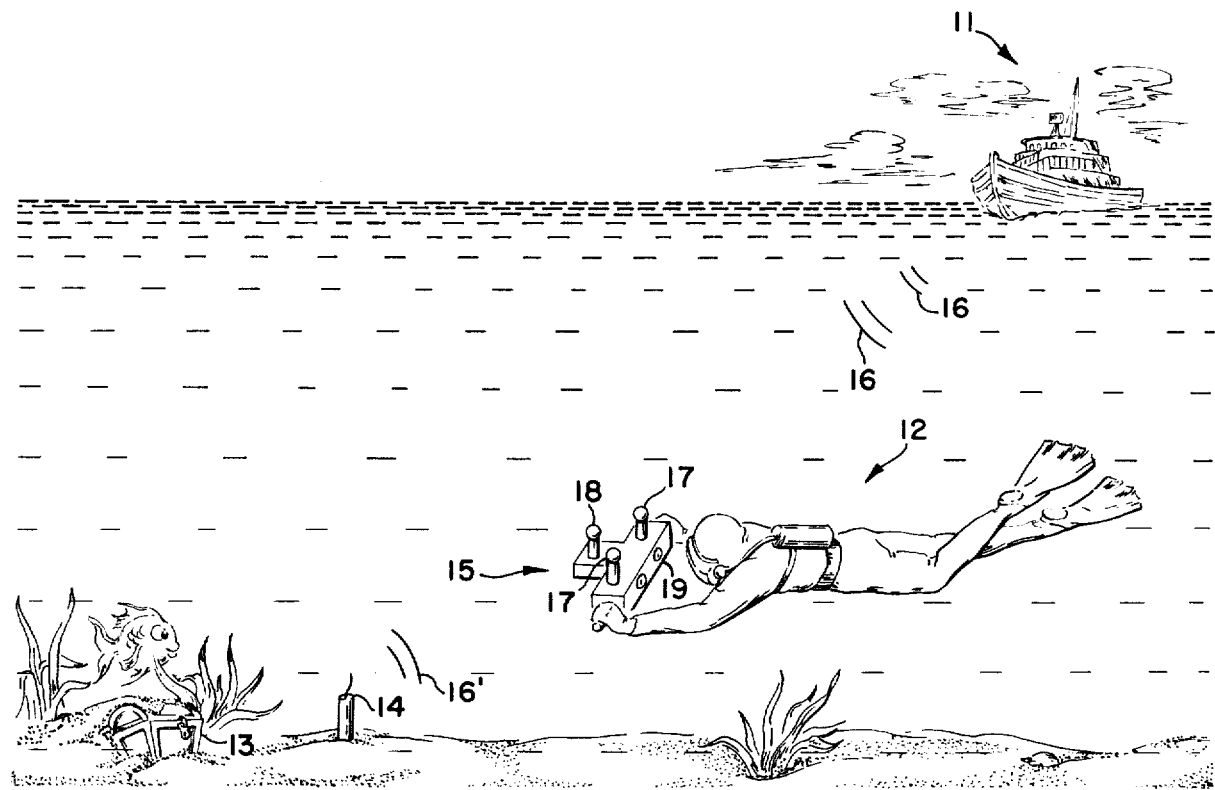
FIG. 1 is a perspective view of the invention in its operational environment.

Referring to FIG. 1, a salvage vessel 11 provides a base station for free swimming diver 12 in the recovery of submarine objects such as indicated at 13. By means of acoustic beacon signals from salvage vessel 11 and from a submarine beacon 14, diver 12 navigates to and from the vicinity of submarine object 13 by means of a diver-carried navigation instrument 15. Navigation instrument 15 includes a plurality of hydrophones for receiving signals from beacon 14 or salvage vessel 11 and for deriving a navigational information therefrom. As shown, the hydrophones are three in number comprising a rear pair of hydrophones 17 and the forward hydrophone 18 disposed such as to form a triangular datum receiving configuration. An instrument panel 19 displays the derived navigation information obtained from either salvage vehicle 11 or beacon 14. The acoustic propagation from oceanographic vessel 11 is indicated generally at 16 and that from beacon 14 indicated at 16'.

It should be understood that conventional navigational acoustic beacons are known in the art and are used in the practice of the invention. By conventional means, not shown, the diver-carried navigational instrument 15 may select either the navigations signal coming from salvage vessel 11 or that coming from beacon 14. In this manner diver 12 may navigate from salvage vessel 11 to underwater object 13 in turbid waters or under cover of darkness without surfacing to determine his position. In many instances, this navigation technique is very helpful such that salvage vessel 11 need not remain on station over object 13 thereby betraying its position or the nature of the activity being conducted. Obviously, there are other applications where navigation of underwater swimmer-divers is required without having the diver surface to provide navigational bearings and it should be noted that this invention should be so understood as not limited to the aforedescribed salvage operation.

Figure 2:
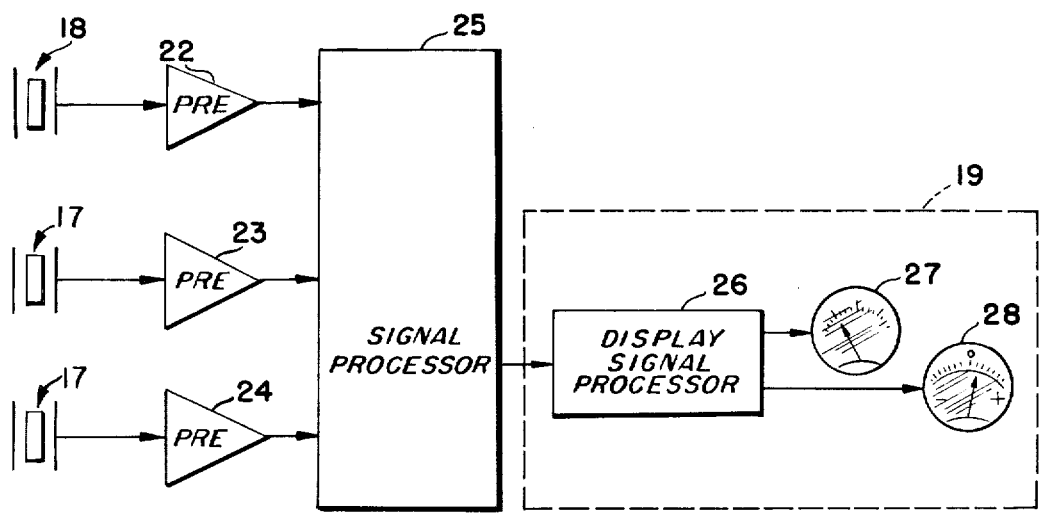
FIG. 2 is a diagrammatic view of the components of the diver's navigation instrument shown in FIG. 1.

Referring to FIG. 2, a diagrammatic representation of the overall system comprising navigation instrument 15 is illustrated so as to move accurately locate and clearly explain.

As shown, hydrophone 18 and hydrophones 17 are connected via preamplifiers 22, 23 and 24 respectively a signal processing circuit 25. Signal processing circuit 25 is a conventional, acoustic navigation processing circuit and derives signal information from the impinging navigation beacons to obtain information therefrom which is characterized as the product of a constant in the sine of the bearing angle and a constant times the cosine of the angle. Display signal processor 26, which is a portion of the read-out system 19 of navigational instrument 15, processes this sine and cosine information to obtain the bearing angle. This bearing angle information is transmitted to appropriate read-out instruments such as indicated at 27 and 28.

Remembering the fundamental geometric relationship that the tangent of the angle is equal to the quotient of the sine divided by the cosine, the fundamental operation of the display signal processor 26 will be understood in such a derivation of the tangent the constant portion of the products is cancelled by the mathematical division operation.

Figure 3:
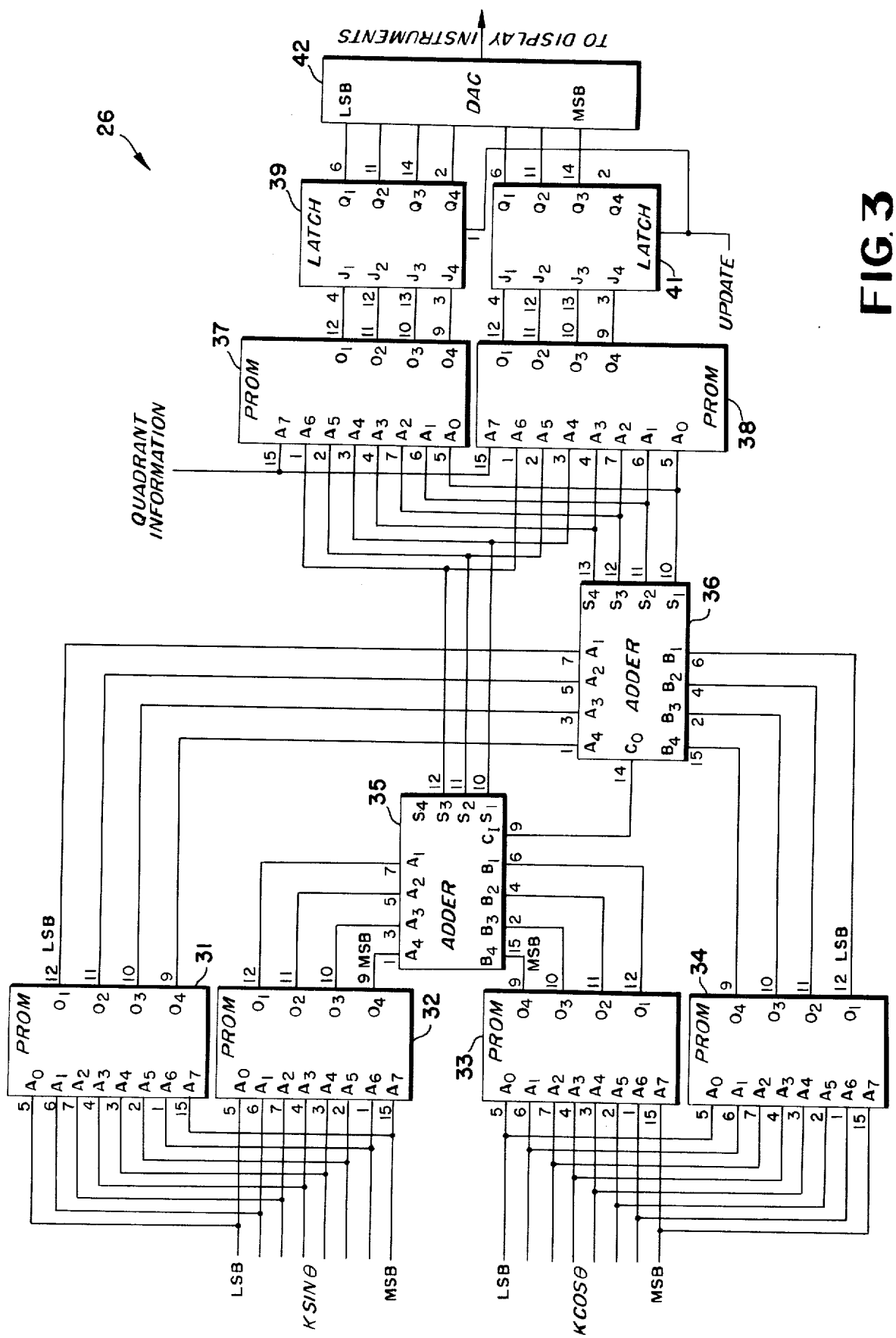
FIG. 3 is a diagrammatic representation of the circuit of the invention.

Referring to FIG. 3, the implementation of this operation and the circuitry used to accomplish it will now be described. As shown, a pair of programmed read-only-memories (PROM) 31 and 32 are connected in a parallel to receive an eight digit digital representation of the Ksin$\theta$ information. These PROMS are parallel connected, that is, the least significant bit of information (LSB) is connected to the corresponding input on each of the two PROMS. Similarly, each successing address bit is connected to corresponding inputs until the entire digital address including the most significant bit (MSB) is similarly connected to corresponding terminals of the PROMS 31 and 32. It should be noted that PROMS 31 and 32 are 64×8 memory units of conventional manufacturer. In the developmental model of the invention the PROMS used were those manufactured by the Harris Semiconductor Corporation under the designation H PROM 1024. Of course, other PROMS having the address and storage capabilities required may be used if desired. In this nature, it should be noted that if available, PROMS 31 and 32 might conveniently be a single PROM having the combined address and read-out capability of the pair used which, when connected as shown, serve as a 2048 bit programmable unit. This memory capacity permits five degree angle resolution which is considered sufficient for the illustrated purposes. Of course, greater memory capability in PROMS 31 and 32 would permit more accurate resolution of the bearing angle $\theta$ and resulting greater precision of navigation capability.

PROMS 31 and 32 have an output which corresponds to the logarithm of the addressed Ksin$\theta$ information. In this fashion, they serve as look-up tables of the sine function of 5° segments of the compass rose.

Similarly, the Kcos$\theta$ information is parallel connected to PROMS 33 and 34. This connection and interaction is identical to that disclosed in connection with the PROMS 31 and 32 with the exception that PROMS 33 and 34 store the two's compliment of the logarithm of Kcos$\theta$. The LSB and three adjacent bit output from PROMS 31 and 34 are connected to outer 36. The overflow from outer 36 is connected to adder 35 along with the MSP output from PROMS 32 and 33.

As will be understood, the adding of the logarithm of Ksin$\theta$ with the logarithm of the two's compliment of Kcos$\theta$ is equivalent to the subtraction of the logarithm of Kcos$\theta$ from the logarithm of Ksin$\theta$ or, in effect, the division of Ksin$\theta$ by Kcos$\theta$ giving the output as log tan$\theta$.

Adders 35 and 36 are conventional digit adder circuits and, for example, may be that manufactured by the RCA Corporation under the designator CD4008.

The output from adders 35 into 36 are coupled as a seven digit address to PROM 37 and 38 which, like PROMS 31 and 32, are parallel connected. PROMS 37 and 38 are also fed quadrant information impulses indicating which quadrant of the compass rose angle $\theta$ occupies. Of course, this information is obtained from signal processor 25 in the conventional manner and is determined by the sign, positive or negative of the sine $\theta$ and cosine $\theta$. The output of PROMS 37 and 38 corresponds to the digital representation of the arc tangent $\theta$, that is, a digital value corresponding to the bearing angle $\theta$. This information is held until the arrival of the next pulse by a suitable latch circuit corresponding digital latch units 39 and 41. These latch circuits are conventional digital latch circuits and may comprise, for example, that manufactured by the RCA Corporation and sold under the designator DC4029. The outputs from latch circuits 39 and 41 are connected to conventional digital-to-analog convertor circuit where the digital value of $\theta$ is converted to an analog value to be displayed by a conventional D'Arsonval meter movement such as indicated at 28, FIG. 2. The foregoing description, taken together with the appended claims constitute a disclosure such as to enable a person skilled in the electronics and navigation arts and having the benefit of the teachings contained therein to make and use the invention. Further, the structure herein described meets the objects of invention and generally constitutes a meritorious advance in the art unobvious to such a skilled worker not having the benefit of these teachings.

These and other objects of the invention will become more readily apparent from the ensuring specification taken together with the drawings.

What is claimed is:

1. In a beacon-homing navigation system, a signal processing circuit for converting digital sine and cosine values of a bearing angle into an analog value of said bearing angle comprising:

a first programmed read-only-memory connected to receive said digital sine values to function as an addressable look-up table and storing the logrithmic value of the address;

a second programmed read-only-memory connected to receive said digital cosine values to function as an addressable look-up table and storing the two's compliment of the logrithmic value of the address;

an adder connected to said first and second programmed read-only memories to receive the output signals thereof for summing said output signals;

a third programmed read-only memory connected to said adder to receive the summed output therefrom as addresses so as to function as a look-up table and storing the arc tangent values of the addresses;

latch means connected to said third programmed read-only memory for holding the output of said third read-only memory until a different address signal is applied to said first and second read-only memories; and digital-to-analog converter means connected to said latch means for supplying an analog voltage corresponding to the arc tangent output of said third programmed read-only-memory.

2. A beacon-homing signal processor according to claim 1 where said first programmed read-only memory includes two parallel-connected 64 × 8 memories.

3. A beacon-homing signal processor according to claim 1 wherein said second programmed read-only memory includes two parallel-connected 64 × 8 memories.

4. A beacon-homing signal processor according to claim 2 wherein said second read-only memory includes two parallel-connected 64 × 8 memories.

* * * * *